US008773454B1

(12) United States Patent
McKinnon

(10) Patent No.: US 8,773,454 B1
(45) Date of Patent: *Jul. 8, 2014

(54) PERSONALIZED TAGGING OF MEDIA ON MOBILE DEVICES

(71) Applicant: Michael Dean McKinnon, San Diego, CA (US)

(72) Inventor: Michael Dean McKinnon, San Diego, CA (US)

(73) Assignee: Camtagger LLC, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/910,206

(22) Filed: Jun. 5, 2013

Related U.S. Application Data

(63) Continuation of application No. 13/804,406, filed on Mar. 14, 2013.

(51) Int. Cl.
- *G09G 5/02* (2006.01)
- *G09G 5/00* (2006.01)
- *G06F 21/64* (2013.01)

(52) U.S. Cl.
CPC ..................... *G06F 21/64* (2013.01)
USPC .......................................... 345/592; 345/629

(58) Field of Classification Search
None
See application file for complete search history.

(56) References Cited

U.S. PATENT DOCUMENTS

| | | | | |
|---|---|---|---|---|
| 7,483,042 B1* | 1/2009 | Glen | ............................ | 345/629 |
| 2001/0049704 A1* | 12/2001 | Hamburg et al. | ............. | 707/530 |
| 2009/0024992 A1* | 1/2009 | Kulaga et al. | ................. | 717/177 |
| 2011/0081952 A1* | 4/2011 | Song et al. | .................... | 455/566 |

OTHER PUBLICATIONS

Jerry W. Stewart, "Live Photo Gallery 2011—Sandy Senior Center", Dec. 1, 2010, Revised Apr. 2011.*
"Microsoft Digital Image 2006 Suite Edition: User's Manual", Microsoft Corporation, 2005.*
Samsung Galaxy SII Mobile Phone User Manual, 2011.*

* cited by examiner

*Primary Examiner* — Kee M Tung
*Assistant Examiner* — Sing-Wai Wu
(74) *Attorney, Agent, or Firm* — Dawn-Marie Bey; Bey & Cotropia PLLC

(57) ABSTRACT

A processor-implemented method and mobile device for tagging media with personalized information is disclosed. An input component of the mobile device receives selection for one or more first media and passes the selection to the processor. The input component receives a request to tag the selected first media with personalized information, where the personalized information includes second media, which may include images or textual information. The second media corresponding to the personalized information is displayed and an input selection is received. The processor in the mobile device processes copies of the selected first media and of the selected second media using a blending computer code, thereby creating a blended media. The copy of the selected first media is a background feature and the copy of the selected second media is a foreground feature. The blended media is stored and displayed on the mobile device.

10 Claims, 9 Drawing Sheets

PERSONALIZED TAGGING OF MEDIA ON MOBILE DEVICES

CROSS REFERENCE TO RELATED APPLICATIONS

This application is a continuation of and claims benefit of U.S. patent application Ser. No. 13/804,406 that was filed on Mar. 14, 2013, and that is incorporated herein by reference in its entirety.

TECHNICAL FIELD

The present disclosure relates to a processor-implemented method and system for tagging media on mobile devices with personalized information.

BACKGROUND

A "mobile device," as disclosed herein, includes a smart phone, a mobile phone, a tablet computer, a personal digital assistant (PDA), a digital camera, an video player, and other similar devices. Some of these mobile devices may include a camera and storage, and are capable of capturing and storing various media, such as images and videos. Further, these mobile devices are configured for wireless or wired internet capability using 108.11 a/b/g/n standards, GSM/CDMA based data standards, RJ45 Cat5 Ethernet standards, Bluetooth shared Ethernet standards, and other internet-able standards. This allows one to transfer the captured media to one or more remote computers. Such transfer of media includes the capability of sharing the captured images and videos on social sharing websites; electronically mailing (e-mail) the images to one or more friends or contacts; posting the images to blogs or websites, and printing the images to a remote printer or a printed attached to a remote computer.

However, media recorded on a mobile device is typically not secured prior to transfer to the remote computer. The owner of the media may find it difficult to claim rights to the media, because the source may not be confirmed. Further, most mobile devices are not equipped with the hardware, software, or firmware capabilities to perform complex security functions on the captured media prior to transferring the media to a remote computer.

SUMMARY

The method, mobile device, and mobile device program product described herein attempt to overcome the drawbacks discussed above using a processor-implemented method, mobile device, or mobile device program product for tagging media on mobile devices with personalized information.

In an exemplary implementation, a processor-implemented method for tagging media on a mobile device with personalized information is disclosed. The method includes displaying, on a display of the mobile device, one or more first media, which includes one or more photos or videos. Typically, the one or more photos or videos are stored in a storage component of the mobile device. The method includes receiving, from an input component of the mobile device, a selection for one or more of the displayed one or more first media. Further, the input component also receives, from the input component of the mobile device, a request to tag the selected one or more first media with personalized information. In an exemplary implementation, the personalized information includes one or more second media, such as images or textual information. The method includes a displaying step, on the display of the mobile device, for displaying the one or more second media corresponding to the personalized information. A receiving step includes receiving, from the input component of the mobile device, a selection from the one or more second media. A storing step allows the mobile device to store a copy of the selected one or more first media and a copy of the selected one or more second media in a first temporary memory component of the mobile device. A processing step utilizes a processor of the mobile device to perform a blending function on the copies of the selected one or more first media and of the selected one or more second media. The blending function is processed using a corresponding blending computer code, which is typically stored in a computer code storage component of the mobile device. The processor outputs a blended media, which includes the copy of the selected one or more first media as a background feature and the selected one or more second media as a foreground feature. A storing step stores the blended media in a second temporary memory component of the mobile device. This stored blended media is a tagging of the selected one or more first media with the selected one or more second media. A display step allows a display component of the mobile device to display the blended media In yet another exemplary implementation, a mobile device for tagging media with personalized information is disclosed herein. The mobile device includes a display component connected to a storage component. The display component is typically applicable for displaying one or more first media, including one or more photos or videos stored in the storage component. An input component is included in the mobile device for receiving a selection of one or more of the displayed one or more first media. Further, the input component of the mobile device is connected to a processor. The input component receives a request and provides the request to the processor. The request is typically for tagging the selected one or more first media with personalized information. The personalized information may include one or more second media including images or textual information. The display component of the mobile device is typically applicable for displaying the one or more second media corresponding to the personalized information. The input component of the mobile device is configured to receive a selection from the one or more second media and to provide the selection to the processor. The implementation includes a first temporary memory component in the mobile device for storing a copy of the selected one or more first media and a copy of the selected one or more second media. The processor of the mobile device is available to process the copies of the selected one or more first media and of the selected one or more second media using a blending computer code stored in a computer code storage component of the mobile device. This blending process creates a blended media. The blended media includes the copy of the selected one or more first media as a background feature and the copy of the selected one or more second media as a foreground feature. A second temporary memory component of the mobile device is beneficially applicable for storing the blended media, resulting in tagging of the selected one or more first media with the selected one or more second media. A display component of the mobile device is typically applicable for displaying the blended media.

In another exemplary implementation, a mobile device program product for tagging media on the mobile device with personalized information is disclosed. The mobile device program product includes computer code for performing specific functions. As disclosed in this exemplary implementation, the mobile device program product includes computer code for displaying, on a display of the mobile device, one or more first media including one or more photos or videos. The one or more photos or videos are typically stored in a storage component of the mobile device. Further, the mobile device program product includes computer code for receiving, from an input component of the mobile device, selection for one or more of the displayed one or more first media. Computer code is also available for receiving, from the input component of the mobile device, a request to tag the selected one or more first media with personalized information. The personalized information includes one or more second media including images or textual information. Computer code also exists for displaying, on the display of the mobile device, the one or more second media corresponding to the personalized information. The mobile device program product includes computer code for receiving, from the input component of the mobile device, a selection from the one or more second media; and computer code for storing, in a first temporary memory component of the mobile device, a copy of the selected one or more first media and a copy of the selected one or more second media. Further, a blending computer code is present, which allows for processing, on a processor of the mobile device, the copies of the selected one or more first media and of the selected one or more second media, thereby creating a blended media. The blended media includes the copy of the selected one or more first media as a background feature and the copy of the selected one or more second media as a foreground feature. Computer code also exists for storing, in a second temporary memory component of the mobile device, the blended media, thereby tagging the selected one or more first media with the selected one or more second media. Computer code is also available for displaying, on the display component of the mobile device, the blended media.

In an exemplary implementation, the computer code may be independent classes, functions, modules, or schemas that may pass information between each other or in a class hierarchy structure. In some exemplary implementations, the mobile device program product is a software application, stored in executable format in a mobile device. Further, in other exemplary implementations, the executable format of the computer code is a dex code format, implemented by the Android® operating system or an xcode code format, implemented by the iPhone® operating system. The mobile device may be a phone or a tablet computer. Further, in accordance with an exemplary implementation, the mobile device program product is a storage media, which includes the computer codes disclosed above as an installable software application for mobile devices.

In an exemplary implementation, additional steps may be implemented as part of the processor-implemented method or the mobile device program product disclosed above. Alternatively, the input component and the processor of the mobile device may perform additional steps. The additional steps are performed via computer code that enables each step. The additional steps include a receiving step for receiving, from the input component of the mobile device, instructions to perform further personalization of the blended media. Further, in an exemplary implementation, the mobile device of this disclosure may include a computer code storage component for storing special computer code corresponding to certain instructions for further personalization. A retrieving step may follow the receiving step, allowing the processor to retrieve, from the computer code storage component of the mobile device, computer code corresponding to the received instructions. The retrieved computer code is processed at the processor of the mobile device, thereby performing a personalizing function for editing the images or textual information of the foreground feature. The personalizing function includes one or more of: moving the image or textual information to a desired location on the background feature, changing the opaqueness, contrast, or brightness of the foreground feature, and changing a textual information of the foreground feature.

In yet another exemplary implementation, each of the edits made to the foreground feature of the blended image results in a new blended image. The processor creates the new blended image for each of the edits. The new blended image is stored in a third temporary memory component of the mobile device. Further, the new blended image is displayed on the display of the mobile device. In another exemplary implementation, an undo function is available in accordance with the disclosure herein. The undo function is received as an instruction at the input component and is passed to the processor. The undo computer code corresponding to the undo instruction is processed by the processor, causing the new blended image on the display to be replaced by the blended image from the second temporary memory component. In another exemplary implementation, a redo function is available in accordance with the disclosure herein. The redo function is received as an instruction at the input component and is passed to the processor. A redo computer code corresponding to the redo instruction is processed by the processor, causing the blended image on the display to be replaced by the new blended image from the third temporary memory component.

In another exemplary implementation, the request to tag the first media with one or more second media includes providing an extracting option to the display component and receiving a request for executing the extracting option. The execution of the extraction option causes the processor to process an extracting computer code corresponding to the extracting option. This allows a portion of the image from the personalized information to be extracted and used as the foreground feature of the blended image. Further, the extracting computer code allows the selection of the one or more second media to include additional personalization, corresponding to a pixel-following cut-and-paste selection function, a freehand selection cut-and-paste selection function, and a fixed geometric pattern cut-and-paste selection function. In an exemplary implementation, the processor-implemented method disclosed herein is implemented on a phone or a tablet computer. In such exemplary implementations, the blending computer code is dex code, implemented by the Android® operating system or xcode, implemented by the iPhone® operating system. In an exemplary implementation, one or more of the receiving steps is received from a touchscreen component functioning as the input component. Further, in other exemplary implementations, the one or more first media is captured by a camera component of the mobile device. In another exemplary implementation, the blended media is transmitted by a transmitter component of the mobile device to a social media sharing website. The transmitter component may rely on a data connection for transmitting the blended media.

BRIEF DESCRIPTION OF THE DRAWINGS

The accompanying drawings constitute a part of this specification and together with the specification, illustrate certain exemplary implementations of this disclosure.

DETAILED DESCRIPTION

Reference will now be made in detail to the preferred implementations, examples of which are illustrated in the accompanying drawings.

The processor-implemented method, mobile device, and mobile device program product disclosed herein is configured to tag media on mobile devices with personalized information. The personalized information may be further edited by an end-user of the mobile device.

Figure 1:
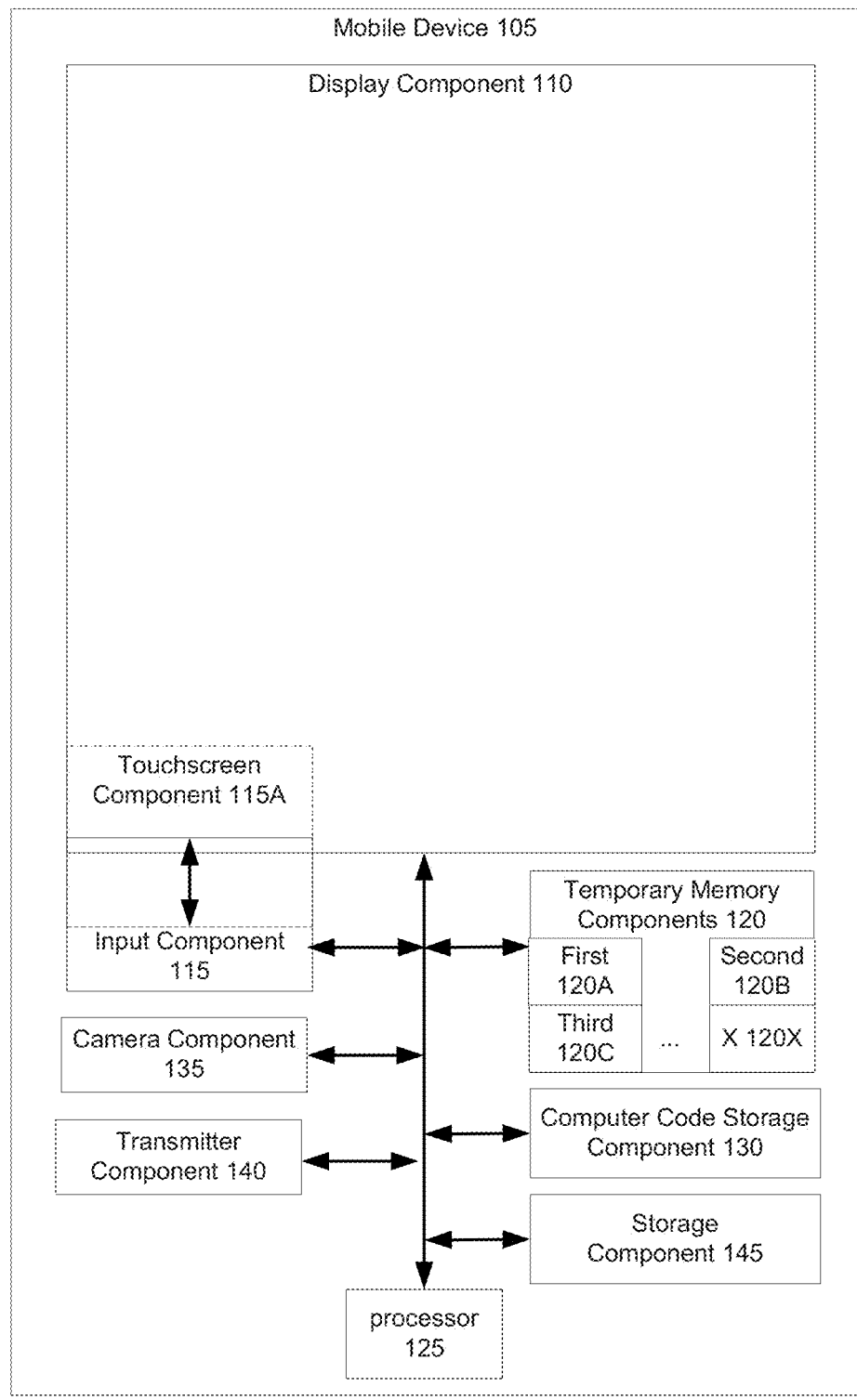
FIG. 1 illustrates a mobile device and a mobile device program product for tagging media on mobile devices with personalized information in accordance with exemplary implementations of this disclosure.

FIG. 1 illustrates a mobile device 105 and a mobile device program product 100 for tagging media on mobile devices with personalized information in accordance with exemplary implementations of this disclosure. The mobile device 105 includes a display component 110 for displaying media capture by a camera component 135. Alternatively, the mobile device is only capable of displaying on the display component 110, any previously stored media from the storage component 145. Further, the mobile device 105 includes temporary memory storage components 120, which may include a first, second, and third memory components 120A-C.

The temporary memory component 120 may also include additional temporary memory components 120X that enables the mobile device 105 to perform post-capture, image processing functions, such as a adjusting for opacity, color, and cropping of images; or adjusting for color, frame rates, and frame length for video processing functions. The additional temporary memory components 120X may also provide room for additional personalization of the selected first media. Processor 125 may be a single core, dual core, quad core, or a general multiple core processor, capable of handling advanced graphic functions and advanced digital signal processing functions for image and video editing. The temporary memory components 120 may be a random access memory (RAM) component, functioning as a cache within the processor 125. A direct bus may connect the temporary memory components 120 to the processor 125. Such a configuration would allow advanced image and video processing to occur without lag or delay in the user interface displayed on the display component 110.

The input component 115 is illustrated as an impendent component from the display component 110. However, the touchscreen component 115A is illustrated as part of the input component 115. This would allow an end-user to interact with the user interface on display component 110 by touching the screen of the display component 110 with the fingers or using a capacitive touch device, such as a touch pen. Alternatively, the touchscreen component 115A is a resistive touchscreen component 115A attached to the display component 110. The input component 115 may also be a hardware-based input component that is separate from the display component 110. A keypad, a touch pad, a mouse, and other related input components are examples of a hardware-based input component that is separate from the display component 110. For the purpose of simplicity in this disclosure, the input component 115 is referred throughout, but any references to the input component 115 automatically includes touchscreen component 115A, exclusively, or mutually along with a hardware-based input component that is independent of the display component and is not a touchscreen component.

In an exemplary implementation, mobile device 105 includes transmitter component 140, which is configured for wireless or wired internet capability using 108.11 a/b/g/n standards, GSM/CDMA based data standards, RJ45 Cat5 Ethernet standards, Bluetooth shared Ethernet standards, and other internet-able standards. This allows an end-user to transfer the tagged media to one or more remote devices.

In an exemplary implementation, FIG. 1 also illustrates a part of an embodiment, where a mobile device program product, in executable form, is rendered on a mobile device for tagging media with personalized information. The mobile device program product is a computer coded program, stored in executable format in the computer code storage component 130 of the mobile device 105. In an exemplary implementation, the computer code is an executable dex code, implemented by the Android® operating system or an executable xcode, implemented by the iPhone® operating system. The computer coded program is configured to utilize the various components 110-145 in mobile device 105 in order to tag media on the mobile device 105 with personalized information. In an exemplary implementation, the computer code storage component 130 is part of the storage component 145.

In another exemplary implementation, FIG. 1 also illustrates a part of an embodiment, where a mobile device program product, in installable software application format, is available for installation on mobile devices, and provides mobile devices with a feature for tagging media with personalized information. In such an implementation, the software application is first installed on mobile device 105 utilizing the computer code storage component 130 to enable the mobile device program product. Thereafter, the computer code is in executable form as disclosed above. In the installable format, the software application includes computer code for tagging media on mobile devices with personalized information. In executable format, the computer code may be actively use for tagging media on mobile devices with personalized information. The installable software application is downloadable via an internet connection or via a wired or wireless connection to a personal computer. Once downloaded, the installable software application is installed to enable full functionality.

The mobile device 105 includes a display component 110 connected to a storage component 145. The display component 110 is typically applicable for displaying one or more first media, including one or more photos or videos stored in the storage component 145. An input component 115 is included in the mobile device 105 for receiving a selection of one or more of the displayed one or more first media. Further, the input component 115 of the mobile device is connected to a processor 125. The input component 115 receives a request and provides the request to the processor 125. The request is typically for tagging the selected one or more first media with personalized information. The personalized information may include one or more second media comprising images or textual information.

The display component 110 of the mobile device 105 is typically applicable for displaying the one or more second media corresponding to the personalized information. The input component 115 of the mobile device 105 is configured to receive a selection from the one or more second media and to provide the selection to the processor 125. The implementation includes a first temporary memory component 120A in the mobile device for storing copies of the selected one or more first media and the selected one or more second media. This ensures that changes made by the tagging process to blend the first and second media do not affect the original versions of the first and second media. The processor 125 of the mobile device 105 is available to process the copy of the selected one or more first media and the copy of the selected one or more second media using a blending computer code stored in a computer code storage component 130 of the mobile device 105. This blending process creates an output blended media. The blended media includes the copy of the selected one or more first media as a background feature and the copy of the selected one or more second media as a foreground feature. A second temporary memory component 120B of the mobile device 105 is beneficially applicable for storing the blended media, resulting in tagging of the selected one or more first media with the selected one or more second media. A display component 110 of the mobile device is typically applicable for displaying the blended media.

Figure 2:
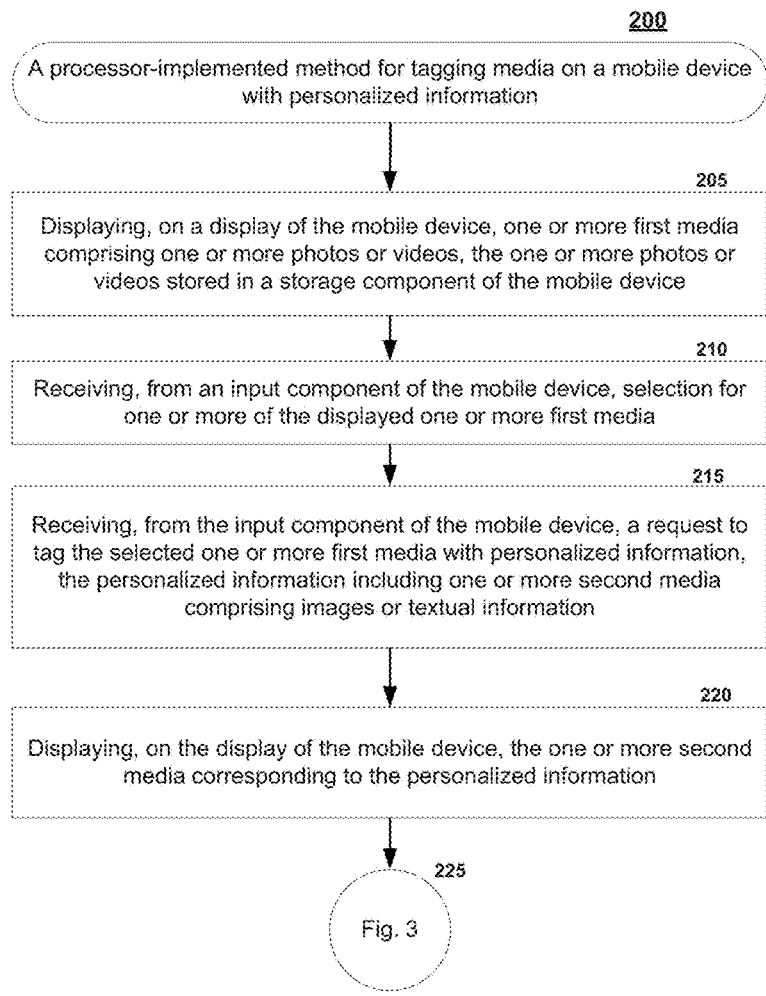
FIGS. 2 and 3 illustrate an exemplary processor-implemented method for tagging media on mobile devices with personalized information.
Figure 3:
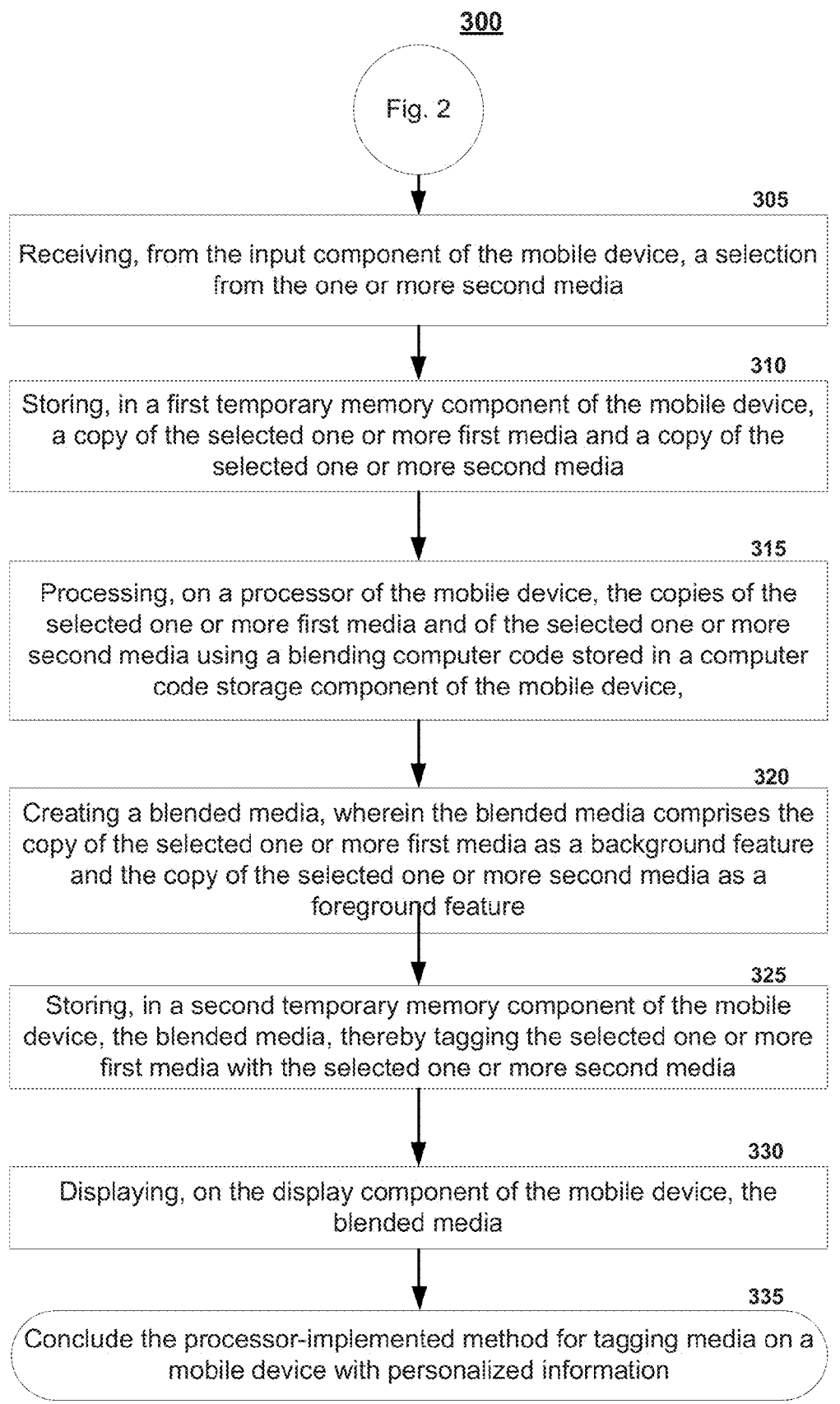

FIGS. 2 and 3 illustrate an exemplary processor-implemented method 200-300 for tagging media on mobile devices with personalized information. The method includes a displaying step, in block 205, for display one or more first media on a display of the mobile device. The one or more media includes one or more photos or videos. Typically, the one or more photos or videos are stored in a storage component of the mobile device. The method includes receiving, at block 210, from an input component of the mobile device, a selection for one or more of the displayed one or more first media. Further, at block 215, the input component also receives from the input component of the mobile device, a request to tag the selected one or more first media with personalized information. In an exemplary implementation, the personalized information includes one or more second media, such as images or textual information.

The method includes a displaying step at block 220, on the display of the mobile device, for displaying the one or more second media corresponding to the personalized information. Block 225 indicates a continuation of the method to FIG. 3. A receiving step at block 305 is configured for receiving, from the input component of the mobile device, a selection from the one or more second media. A storing step at block 310 allows the mobile device to store a copy of the selected one or more first media and a copy of the selected one or more second media in a first temporary memory component of the mobile device. A processing step at block 315 utilizes a processor of the mobile device to perform a blending function on the copies of the selected one or more first media and of the selected one or more second media. The blending function is processed using a corresponding blending computer code, which is typically stored in a computer code storage component of the mobile device. The processor outputs a blended media, illustrated by block 320, which includes the copy of the selected one or more first media as a background feature and the copy of the selected one or more second media as a foreground feature. A storing step at block 325 stores the blended media in a second temporary memory component of the mobile device. This stored blended media is a tagged version of the selected one or more first media with the selected one or more second media. A display step at block 330 allows a display component of the mobile device to display the blended media. Block 335 concludes the processor-implemented method 200-300 for tagging media on mobile devices with personalized information.

Figure 4:
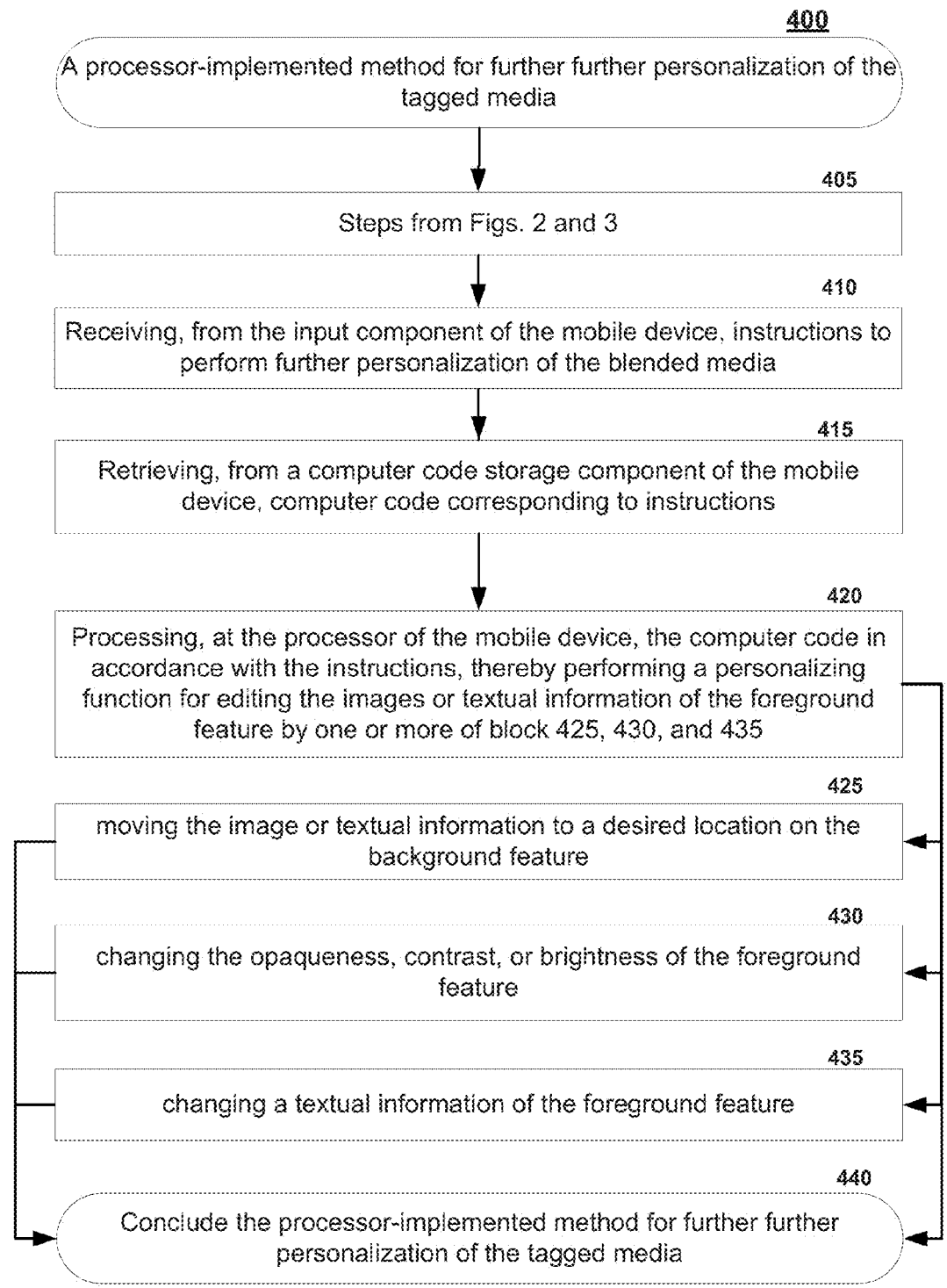
FIG. 4 illustrates an exemplary processor-implemented method for further personalization of the tagging media.

FIG. 4 illustrates an exemplary processor-implemented method 400, which may include further processing steps for further personalization of the tagged media. Block 405 illustrates that method 400 processes the tagged media after method 200-300 have be applied. A receiving step at block 410, receives instructions from the input component of the mobile device to perform further personalization of the blended media. A retrieving step at block 415, retrieves computer code corresponding to instructions from the computer code storage component of the mobile device. A processing step at block 420 is performed on the processor of the mobile device. Here, the computer code, in accordance with the instructions, is processed by performing a personalizing function for editing the images or textual information of the foreground feature. Accordingly, one or more of blocks 425-435 are applicable for the processing step of block 420. For example, a moving personalization step at block 425 allows for moving of the image or textual information to a desired location on the background feature. A changing step at block 430 allows for changing of opaqueness, contrast, or brightness of the foreground feature. A changing step at block 435 allows an end-user to change a textual information of the foreground feature. Block 440 concludes the further processing steps for further personalization of the tagged media.

In yet another exemplary implementation, each of the edits made to the foreground feature of the blended image at blocks 425-435 results in a new blended image. The processor 125 creates the new blended image for each of the edits. The new blended image is stored in a third temporary memory component 120C of the mobile device 105. Further, the new blended image is displayed on the display component 110 of the mobile device.

Figure 5A:
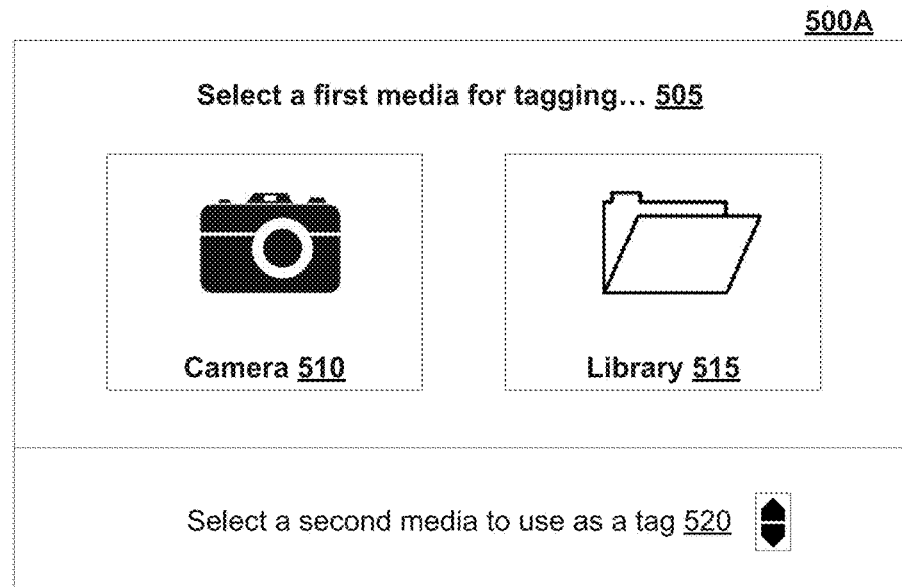
FIGS. 5A, 5B, 6A, 6B, 7A, 7B, 8A, 8B, and 9 illustrate exemplary user-interfaces for an exemplary processor-implemented method for tagging media on mobile devices with personalized information.

FIGS. 5A, 5B, 6A, 6B, 7A, 7B, 8A, 8B, and 9 illustrate exemplary user-interfaces 500-900 for an exemplary processor-implemented method for tagging media on mobile devices with personalized information. The user interfaces 500-900 are illustrative of an exemplary software application, executed as a mobile device program product, on a mobile device. The display component 110 of FIG. 1 provides exemplary user-interface 500A-900 to an end-user for displaying an exemplary processor-implemented method for tagging media on mobile devices with personalized information. FIG. 5A shows, at 500A, the end-user is provided with a selection of first media for tagging 505. The first media for tagging may originate from the camera selection 510, which secures content from camera component 135 or from previously stored first media in library 515, which secures content from storage component 145. The user may also select second media to use as a tag 520. In an exemplary implementation, the first media includes images—photos or pictures, as well as videos; while the second media includes images—photos or pictures, as well as textual information. The videos, photos and pictures may be in any format or compression type supported by the processor 125—including JPEG, GIF, MPEG, etc.

Figure 5B:
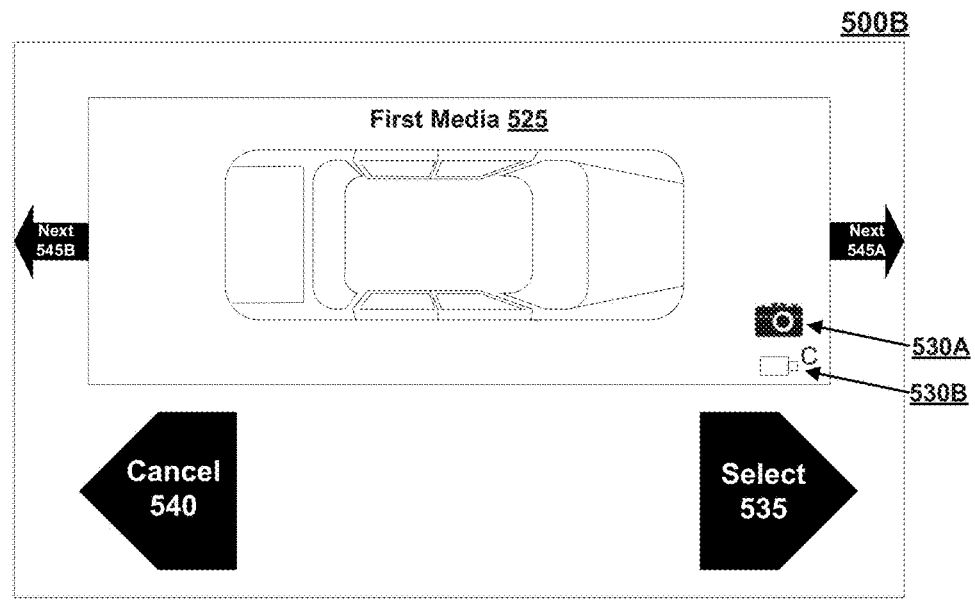

FIG. 5B illustrates a user-interface 500B after selection of the first media source—camera 510 or library 515. The media from each respective source are displayed as first media 525. It is appreciated that any sub-folders may cause intermediate user-interface displays requesting the user to select a folder for the media to apply as first media 525. The user-interface 500B includes "Next" arrow markers 545A-B, using which the end-user may scroll the media 525. It is appreciated that if a touchscreen component 115A is used, the user may scroll the media by swiping across from left to right or right to left to view additional media. The user selections are also made by single taps or double taps of the selected media or folders. Alternatively, a "Select" option 535 is available to the end-user. On a regular input component 115, the user may use the arrow keys or designated keys on the keypad to scroll up, down, left, or right; and may use the "enter" key to make a selection. An exemplary keypad is illustrated in FIG. 7A, as element 720, which is a soft-keypad, but may also illustrate the application of a hardware keypad. Further, the user is presented with icons 530A-B for each first media 525 displayed on the display. The icons 530A-B indicate if the first media 525 currently displayed is an image or video. The camera icon 530A is darkened or turned-on, while the camera icon 530B is lightened or turned-off. Alternatively, either 530A or 530B is displayed depending on the type of media. The alternate implementation is illustrated in FIG. 6A.

Figure 6A:
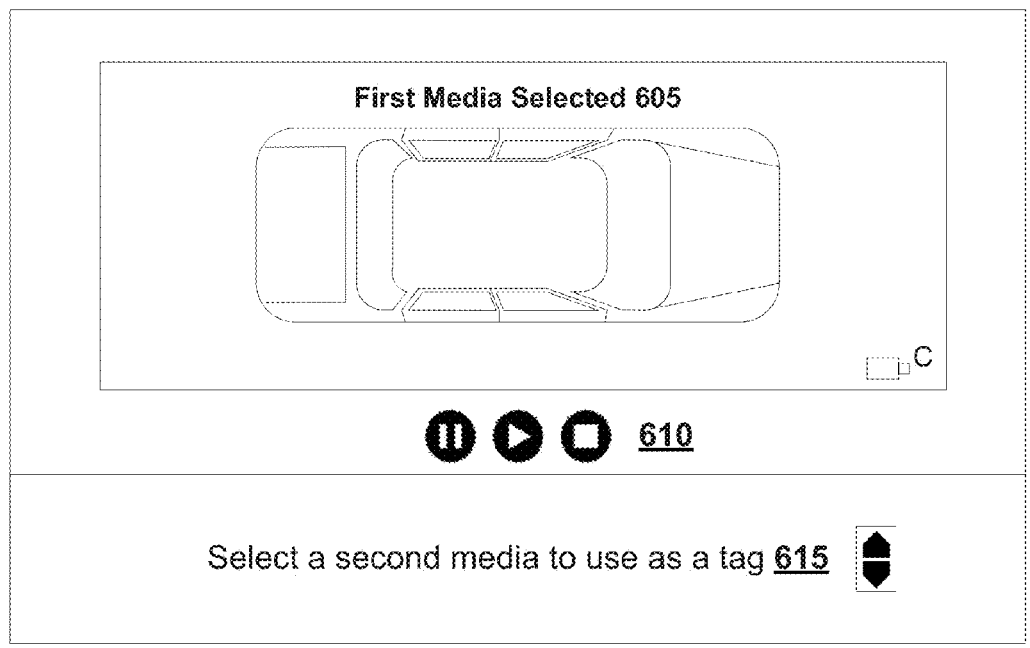
Figure 6B:
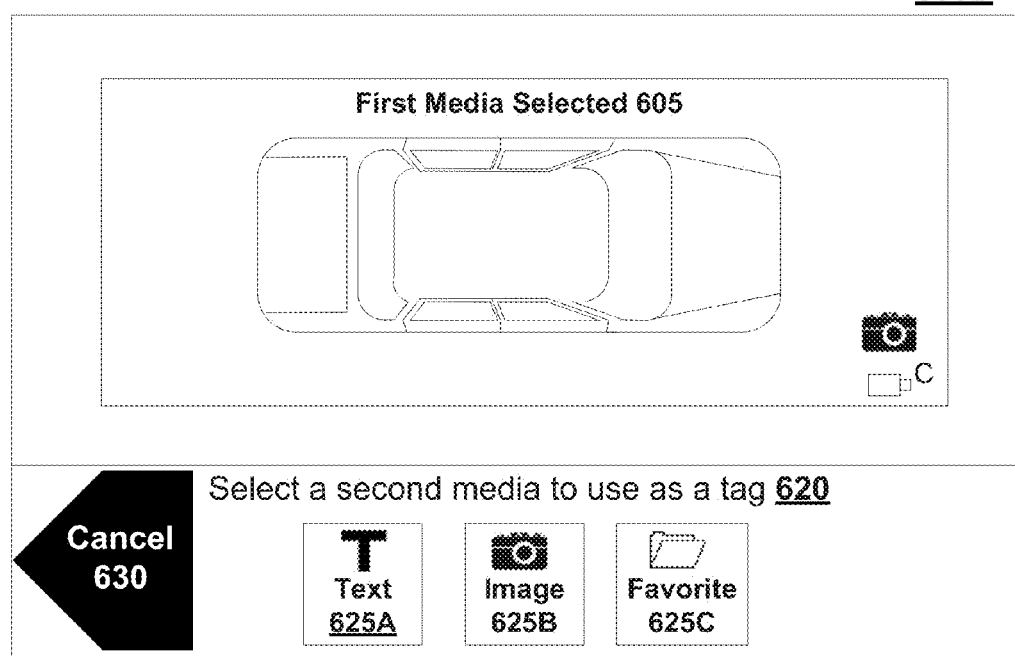
Figure 7A:
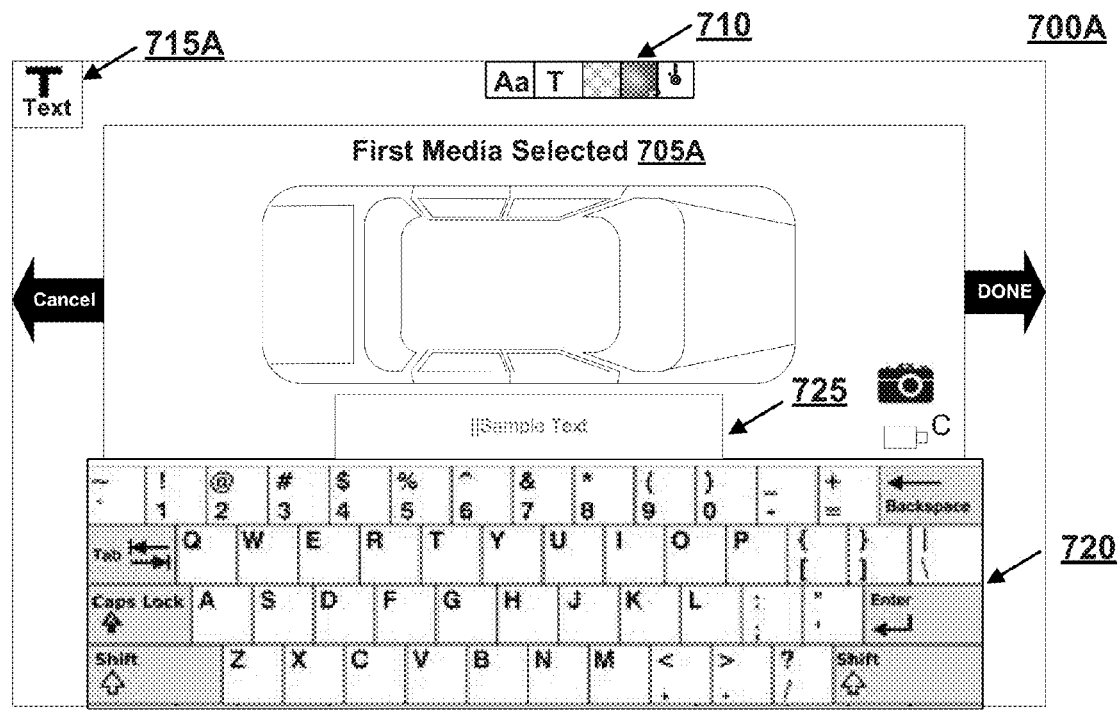

After the end-user has selected a first media, the first media selection is displayed via user-interface 600A at FIG. 6A. In an exemplary implementation, if the selected first media 605 is a video, the end-user is presented with video camera icon on the bottom right corner, and the option to play, pause, or stop 610 the video, as a review mechanism. The user-interface 600A continues to display the option to select a second media to use as a tag 615. The user-interface 600B at FIG. 6B illustrates the first media selected 605 is a plan view of a car. The end-user may tap in the section 615 in order to select a second media to use as the tag for the first media. Upon selection of area 615, the second media options are presented in 620. The end-user may select to use textual information 625A, an image 625B, or from a favorites folder 625C for the second media. In an exemplary implementation, the favorites folder 625C is populated by a specific selection of second media that the end-user requests the software application to store, or is an automated storage of recently or frequently used second media. The end-user may choose to "cancel" 630 the selection, thereby forcing the software application to go back to any one of a number of previous screens 500B-600A or the home screen 500A.

In the event that an end-user selects text 625A as the second media, the user-interface 700A, illustrated in FIG. 7A, is displayed on the display component. The user-interface 700A includes a soft-keypad 720, which may be substituted with a hardware-based keypad in the same arrangement format as illustrated in FIG. 7A. The end-user may type text use the keypad 720, which is displayed in a special section 725 of the display. Further, an indication that the text type second media selection is made is illustrated by icon 715A displayed at the left top corner. The text entered by the end-user at section 725 may also be edited to include complex graphics, fonts, font-sizes, font-colors, background colors, font-angles, and brightness. The availability of complex graphics is dependent on the temporary storage component capacity and the processor specifications in the mobile device. The first media selected may continue to be displayed at 705A.

Figure 7B:
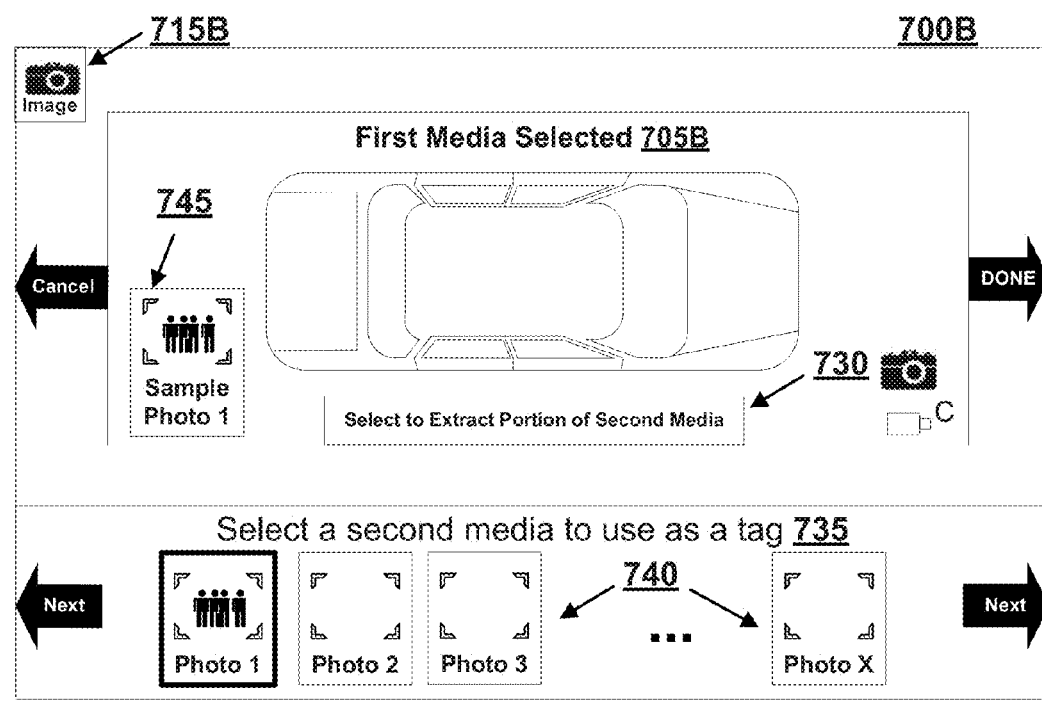

In the event that an end-user selects image 625B as the second media, the user-interface 700B, illustrated in FIG. 7B, is displayed on the display component. The user-interface 700B includes an icon 715B indicating the second media selection. Further, the user-interface displays a section 745 for the selected second media image from the stream of second media images 740. As the end-user changes selection 735, the sample photo 1 at section 745 may change. Further, the current selection may be highlighted—illustrated as a bold exterior in the list of images 740. The end-user may choose to continue with a selected second media image by tapping or selecting "DONE," or may choose to further extract portion of the second media by clicking or tapping on the section 730 of the display. As with the display of first media, the second media 740 in section 735 may be scrolled by swiping from left to right, by tapping the "NEXT" sections of the display, or by moving a cursor to the region of the section labeled "NEXT" and pressing the "enter" key on the keypad. The sections labeled "DONE," "CANCEL," and "NEXT" may be highlighted or changed from light to bold to indicate that a cursor exists in the section. A different highlight may be applicable to illustrate a selection, when the "enter" key is pressed or the section is selected.

Figure 8A:
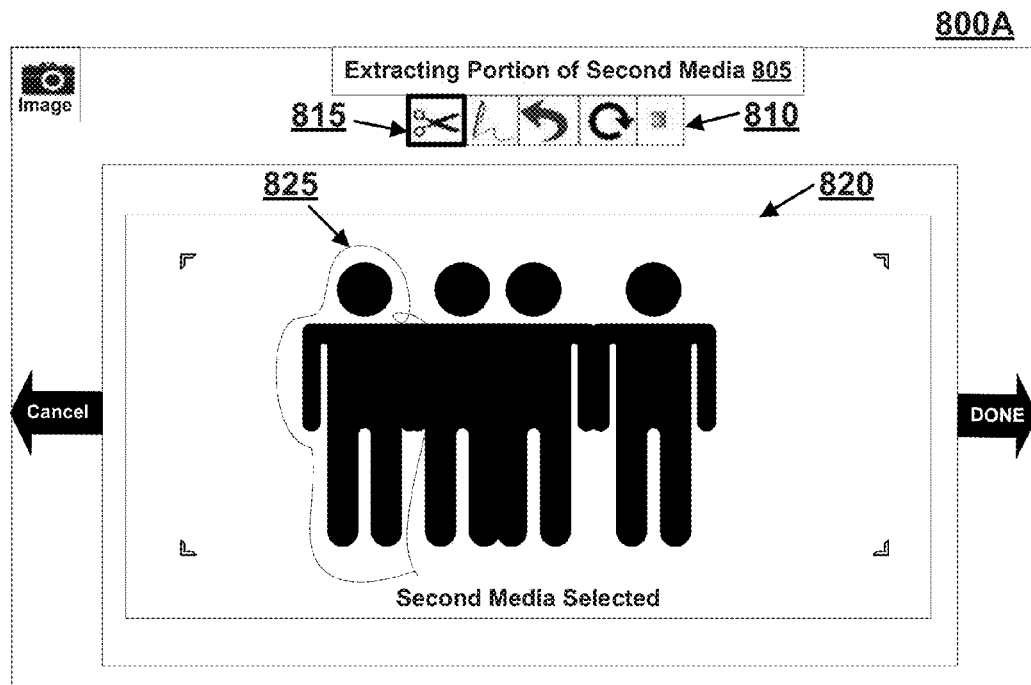

In the event that the end-user selects to extract portion the selected second media image by selecting section 730, user-interface 800A is displayed, as illustrated in FIG. 8A. User-interface 800A includes the title "Extracting Portion of Second Media" 805 or an appropriate title indicating that the user is making changes to the selected second media. In another exemplary implementation, the request to tag the first media with the second media includes providing the display component with an extracting option. This is illustrated via the extraction option 730 in user-interface 700B, in FIG. 7B. The extracting option allows further personalization of the tagging method disclosed herein. The extracting option is executed using a corresponding extracting computer code from the computer code storage component, and is processed on the processor.

The extracting computer code presents the end-user with extracting functions 810. The user may select a specific section of the extracting computer code for the selection of the second media. Such specific section of the extraction computer code allows the end-user to perform one of: a pixel-following cut-and-paste selection function, a freehand selection cut-and-paste selection function, and a fixed geometric pattern cut-and-paste selection function. As illustrated in FIG. 8A, the user selects a cut function 815 after selecting an area of extraction 825. The neighboring function to the cut function 815 is a freeform selection tool that is typically used to make selection 825. There is an undo function and a redo function among the tools in 810. This allows the end-user to select a freeform selection 825 for extraction of a portion of the selected second media 820. The portion 825 of image 820 is the personalized information to be extracted and used as the foreground feature of the blended image. In an exemplary implementation, this extraction step may be a part of the second media selection, where the selection of the entire second media is an intermediate step and the selection of a part of a second media image is the final step.

In an exemplary implementation, the changes made to the first media is saved in a second temporary memory component, so that an undo option in section 810 may retrieve the original image. A redo function in 810 may provide the end-user with the changes made to the original image from a second or a third temporary storage component of the mobile device. In another exemplary implementation, the undo function in 810 is available in accordance with the disclosure herein. The undo function is received as an instruction at the input component and is passed to the processor. The undo computer code corresponding to the undo instruction is processed by the processor, causing the new blended image on the display to be replaced by the blended image from the second temporary memory component. In another exemplary implementation, a redo function is available in accordance with the disclosure herein. The redo function is received as an instruction at the input component and is passed to the processor. A redo computer code corresponding to the redo instruction is processed by the processor, causing the blended image on the display to be replaced by the new blended image from the third temporary memory component.

Figure 8B:
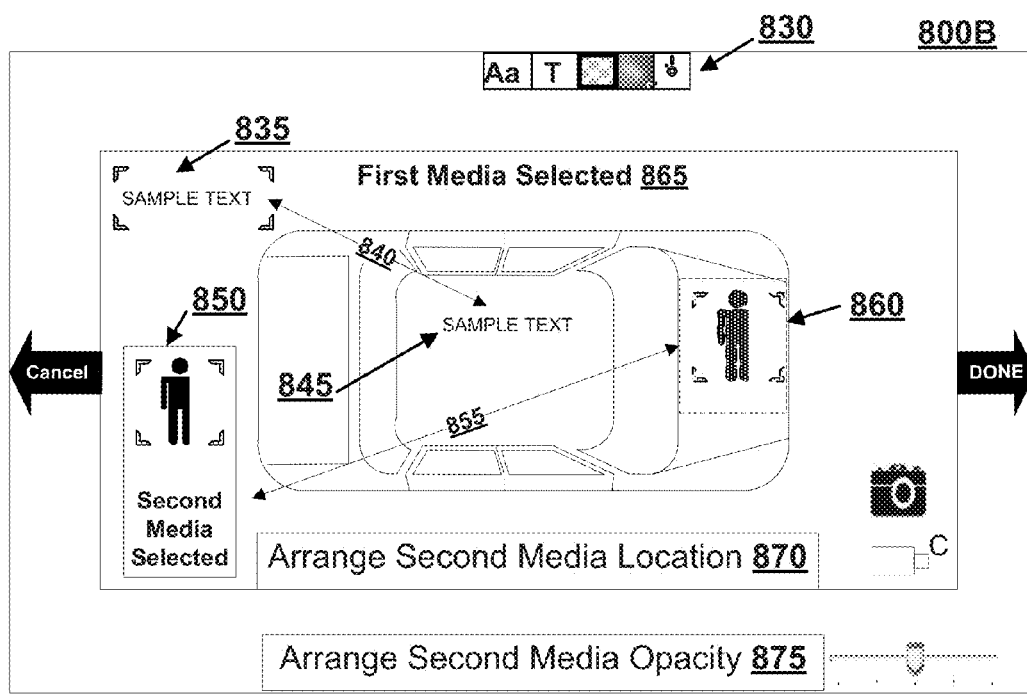

After the final step of the second media selection has been completed, the end-user selects "DONE" and is presented with user-interface 800B, illustrated via FIG. 8B. The user-interface 800B includes further editing tools 830, which includes a save function to save changes made the selected first media 865. The edits at this stage allows an end-user to change the location 855 of the selected second media from 850 to 860. If the selected second media is textual information, the sample text may be moved 840 from 835 to 845. It is appreciated that the movement of media is implemented via a touchscreen by double-tapping and dragging the image, or by selecting the second media and selecting the end location for the second media. The second media may also be re-arranged by tapping on section 870 to unlock the second media location and to allow re-arrangement of the second media. Alternatively, the second media is a foreground image that is not locked until the blending process is complete. The end-user may also adjust opacity of the selected second media 860 by moving the slider left or right. A value may be added to inform the user of the numerical value of the opaqueness of the selected second media. It is appreciated that the disclosure herein allows an end-user to provide one or more second media, including both the text and an image on the same first media.

It is appreciated that in one exemplary implementation, the whole first media selection process may occupy a single screen of the display and may be completed before a second media selection process follows. Alternatively, a second media selection process may be first instituted, where a second media is first selected, then one or more first media is selected and the second media applies to a predetermined location on each of the selected first media.

Figure 9:
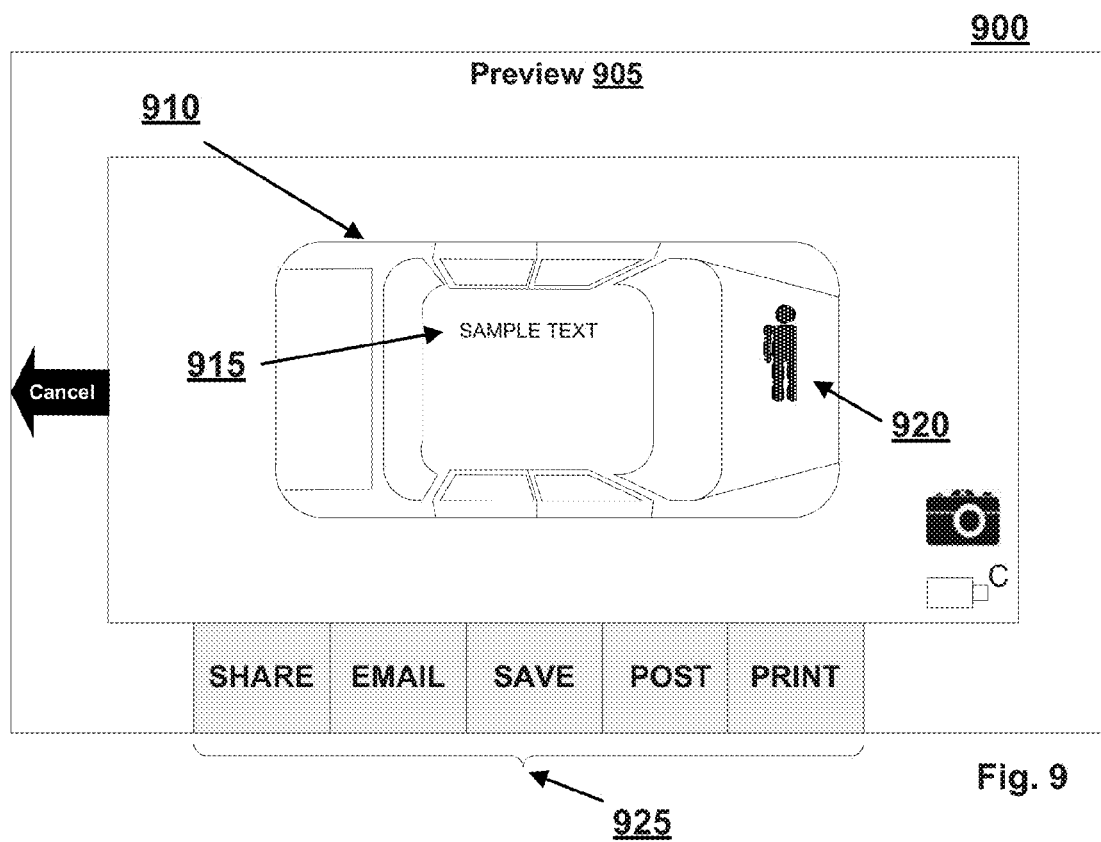

After completion of the blending process, a preview of the blended media is presented via user-interface 900, illustrated in FIG. 9. 910 is the blended media, including the selected first media—the plan view of a car. 920 is one selected second media, arranged in the location on the plan view of the car, and arranged to have a certain opaqueness, illustrated by the dotted fill in 920. 915 is an optional second selected second media that is a text type of second media, which is also arranged in a location and to an opaqueness determined by the end-user. The end-user may select to transfer the blended media 910 to a remote computer using the options in section 925. In an exemplary implementation, the end-user may add a note to the image, prior to sharing it on social media, such as YouTube®; emailing it to contacts and friends; saving it; posting it to a website; or printing it to a remote computer or printer. When saved, the end-user will have the original image, saved in the storage component and the new blended image, permanently stored in the storage component with a new filename. The end-user may elect to enter a new filename or may use an automated filename.

The exemplary methods and acts described in the implementations presented previously are illustrative, and, in alternative implementations, certain acts can be performed in a different order, in parallel with one another, omitted entirely, and/or combined between different exemplary implementations, and/or certain additional acts can be performed without departing from the scope and spirit of the disclosure. Accordingly, such alternative implementations are included in the disclosures described herein.

The exemplary implementations can be used with computer hardware and software that perform the methods and processing functions described above. Exemplary computer hardware include smart phones, tablet computers, notebooks, notepad devices, personal computers, personal digital assistances, and any computing device with a processor and memory area. As will be appreciated by those having ordinary skill in that art, the systems, methods, and procedures described herein can be embodied in a programmable computer, computer executable software, or digital circuitry. The software can be stored on computer readable media. For example, "computer code," "software application," "software module," "scripts," and "computer software code" are software codes used interchangeably for the purposes of simplicity in this disclosure. Further, "memory product," "memory," "computer-readable code product" and storage can include such media as floppy disk, RAM, ROM, hard disk, removable media, flash memory, memory stick, optical media, magneto-optical media, CD-ROM, etc.

Although specific implementations have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary implementations, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

What is claimed is:

1. A processor-implemented method for tagging media on a mobile device with personalized information, the method comprising:

displaying, on a display of the mobile device, one or more first media comprising one or more previously stored videos, the one or more previously stored videos being stored in a storage component of the mobile device;

receiving, from an input component of the mobile device, selection of one or more of the displayed one or more first media;

displaying on the mobile device the selected first media;

receiving, from the input component of the mobile device, a request to tag the selected one or more first media with personalized information, the personalized information including one or more selectable second media comprising images or textual information;

displaying, on the display of the mobile device responsive to the request to tag the selected one or more first media, the one or more selectable second media corresponding to the personalized information as an overlay on the displayed first media;

receiving, from the input component of the mobile device, a selection from the one or more selectable second media;

storing, in a first temporary memory component of the mobile device, a copy of the selected one or more first media and a copy of the selected one or more second media;

processing, on a processor of the mobile device, the copies of the selected one or more first media and of the selected one or more second media using a blending computer code stored in a computer code storage component of the mobile device, thereby creating a blended media, wherein the blended media comprises the copy of the selected one or more first media as a background feature and the copy of the selected one or more second media as a foreground feature;

storing, in a second temporary memory component of the mobile device, the blended media, thereby tagging the selected one or more first media with the selected one or more second media; and displaying, on the display component of the mobile device, the blended media.

2. The processor-implemented method of claim 1 further comprising:

receiving, from the input component of the mobile device, instructions to perform further personalization of the blended media;

retrieving, from a computer code storage component of the mobile device, computer code corresponding to instructions;

processing, at the processor of the mobile device, the computer code in accordance with the instructions, thereby performing a personalizing function for editing the images or textual information of the foreground feature by one or more of:

moving the image or textual information to a desired location on the background feature; and changing the opaqueness, contrast, or brightness of the foreground feature;

changing the textual information of the foreground feature.

3. The processor-implemented method of claim 2, wherein each of the edits made to the foreground feature of the blended image results in a new blended image, the new blended image is stored in a third temporary memory component of the mobile device, and the new blended image is displayed on the display of the mobile device.

4. The processor-implemented method of claim 3, wherein an undo function, received as an instruction at the input component is passed to the processor, and wherein an undo computer code corresponding to the undo instruction is processed by the processor, causing the new blended image on the display to be replaced by the blended image from the second temporary memory component.

5. The processor-implemented method of claim 4, wherein a redo function, received as an instruction at the input component is passed to the processor, and wherein a redo computer code corresponding to the redo instruction is processed by the processor, causing the blended image on the display to be replaced by the new blended image from the third temporary memory component.

6. The processor-implemented method of claim 1, wherein the request to tag the first media with one or more second media includes:

providing an extracting option to the display component;

receiving a request for executing the extracting option, wherein the processor processes an extracting computer code, the extracting computer code corresponding to the extracting request and causing the extraction of a portion of the image from the personalized information; and using the portion of the image as the foreground feature of the blended image.

7. The processor-implemented method of claim 6, wherein the extracting computer code for the selection of the one or more second media includes one or more of: a pixel-following cut-and-paste selection function, a freehand selection cut-and-paste selection function, and a fixed geometric pattern cut-and-paste selection function.

8. The processor-implemented method of claim 1, wherein one or more of the receiving steps is from a touch-screen component functioning as the input component.

9. A mobile device including non-transitory computer-readable medium encoded with a computer program for tagging media on the mobile device with personalized information, the computer program comprising:

computer code for displaying, on a display of the mobile device, one or more first media comprising one or more previously stored videos, the one or more previously stored videos being stored in a storage component of the mobile device;

computer code for receiving, from an input component of the mobile device, selection for one or more of the displayed one or more first media;

computer code for displaying on the mobile device the selected first media;

computer code for receiving, from the input component of the mobile device, a request to tag the selected one or more first media with personalized information, the personalized information including one or more selectable second media comprising images or textual information;

computer code for displaying, on the display of the mobile device responsive to the request to tag the selected one or more first media, the one or more selectable second media corresponding to the personalized information as an overlay on the displayed first media;

computer code for receiving, from the input component of the mobile device, a selection from the one or more selectable second media;

computer code for storing, in a first temporary memory component of the mobile device, a copy of the selected one or more first media and a copy of the selected one or more second media;

blending computer code for processing, on a processor of the mobile device, the copies of the selected one or more first media and of the selected one or more second media, thereby creating a blended media, wherein the blended media comprises the copy of the selected one or more first media as a background feature and the copy of the selected one or more second media as a foreground feature;

computer code for storing, in a second temporary memory component of the mobile device, the blended media, thereby tagging the selected one or more first media with the selected one or more second media; and computer code for displaying, on the display component of the mobile device, the blended media.

10. The computer program of claim 9 further comprising:

computer code for receiving, from the input component of the mobile device, instructions to perform further personalization of the blended media, computer code for retrieving, from a computer code storage component of the mobile device, computer code corresponding to instructions;

computer code for processing, at the processor of the mobile device, the computer code in accordance with the instructions, thereby performing a personalizing function for editing the images or textual information of the foreground feature by one or more of:

moving the image or textual information to a desired location on the background feature;

changing the opaqueness, contrast, or brightness of the foreground feature; and changing a textual information of the foreground feature.

* * * * *